United States Patent [19]

Ito

[11] Patent Number: 4,930,048
[45] Date of Patent: May 29, 1990

[54] AIR-CONDITIONING CONTROL BOX

[75] Inventor: Kuniyasu Ito, Gifu, Japan

[73] Assignee: Toyoda Gosei Co., Ltd., Nishikasugai, Japan

[21] Appl. No.: 248,718

[22] Filed: Sep. 26, 1988

[30] Foreign Application Priority Data

Sep. 26, 1987 [JP] Japan .................................. 62-241760
Jun. 28, 1988 [JP] Japan .................................. 63-159709

[51] Int. Cl.⁵ .............................................. F21Y 33/00
[52] U.S. Cl. ........................................ 362/26; 362/27; 362/85
[58] Field of Search ...................... 362/23, 26, 27, 29, 362/31, 32, 85

[56] References Cited

U.S. PATENT DOCUMENTS

| | | | |
|---|---|---|---|
| 3,571,585 | 5/1971 | Schermerhorn | 362/31 |
| 4,124,879 | 11/1978 | Schoemer | 362/26 |
| 4,216,524 | 8/1980 | Leveraus | 362/23 X |
| 4,321,655 | 3/1982 | Bouvrande | 362/23 X |
| 4,447,860 | 5/1984 | Stone et al. | 362/23 X |
| 4,449,024 | 5/1984 | Stracener | 362/31 X |
| 4,800,466 | 1/1989 | Bauer et al. | 362/26 |
| 4,807,091 | 2/1989 | Obata | 362/29 X |

FOREIGN PATENT DOCUMENTS 2144588  11/1977  Fed. Rep. of Germany ........ 362/23

Primary Examiner—Ira S. Lazarus
Assistant Examiner—Richard R. Cole
Attorney, Agent, or Firm—Cushman, Darby & Cushman

[57] ABSTRACT

An air-conditioning control box according to the invention comprises: a casing having a front panel and a rear box, the casing having an inner surface which reflects light at a high efficiency, the front panel having a hole for receiving an air-conditioning control means; a light source mounted in the casing; air-conditioning control means which is inserted in the hole formed in the front panel and which is held to the casing so as to be rotatable or movable; a light transmission member made from a material that transmits light, the light transmission member including a light-incident surface disposed inside the casing and a light-emitting surface disposed along the fringe of the hole; and a shading coating that partially coats a portion of the light-incident surface of the light transmission member which receives a larger amount of light.

11 Claims, 3 Drawing Sheets

AIR-CONDITIONING CONTROL BOX

BACKGROUND OF THE INVENTION

The present invention relates to improvements in an air-conditioning control box mounted on an automotive instrument panel.

A generally-applied air-conditioning control box of this kind is shown in FIG. 5, where the box is generally indicated by numeral 1. The control box 1 comprises a casing 3, a light source 15, and a light transmission member 21. Note that FIG. 5 is a partial cross section of the control box 1. The design provided on the front surface 3 of the control box 1 is shown in FIG. 4.

The casing 3 is provided with a certain number of holes 7 for receiving air-conditioning control means, or knobs 5. A cylindrical retainer 9 for retaining the light transmission member 21 extends from the underside of the fringe of each hole 7. A light source retaining portion 11 is formed at the lower end of the retainer 9. The surface of the retaining portion 11 which faces the light source 15 is made white or otherwise treated so as to act as a reflective surface 13.

The light source 15 comprises a light bulb 17 and a socket 18. This socket 18 is rigidly fixed to the lower wall of the light source retaining portion 11. An electrical cord 19 for the light source 15 is connected to a battery (not shown).

The light transmission member 21 is a cylindrical member made from a transparent resin, such as acrylic resin. The light transmission member 21 is undercut and held to the retainer 9 of the casing 3. The air conditioning control means 5 is slid and fitted in the light transmission member 21. Almost the whole transmission member 21 is covered with the retainer 9, but it has an extension 27 disposed facing the light source. The outer surface of the extension 27 forms a light-incident surface 23. Light directly coming from the light source 15 and light reflected from the reflective surface 13 enters the transmission member 21 through the light-incident surface 23 and are transmitted in the transparent transmission member 21 while reflected diffusedly. Finally, the light is substantially uniformly emitted from the upper end surface of the transmission member 21. That is, the upper end surface forms a light-emitting surface 25. Structures similar to that shown in FIG. 5 are provided for the respective holes 7.

In the air-conditioning control box 1 constructed as described above, the light from the light source 15 makes bright the light-emitting surface 25 disposed around the air-conditioning control means 5. Therefore, the control means 5 seems to be afloat.

In the above-described air-conditioning control box 1, however, one light source 15 is required for each light transmission member 21. Hence, the number of the components is large, increasing the cost of the product.

Furthermore, in order to make the brightness of the light-emitting surface 25 uniform, it is necessary that light be reflected sufficiently diffusedly inside the transmission member 21. Therefore, if the distance between the light-emitting surface 25 and the light-incident surface 23 is short, the brightness of the light-emitting surface 25 may not be made uniform. Accordingly, the transmission member 21 is made large in size. This makes it impossible to realize the demand for miniaturization of the casing 3.

SUMMARY OF THE INVENTION

The present invention has been made to solve the foregoing problems. An air-conditioning control box according to the invention comprises: a casing having a front panel and a rear box, the front panel having a hole for receiving an air-conditioning control means; a light source mounted in the casing; air-conditioning control means which is inserted in the hole formed in the front panel and which is held to the casing so as to be rotatable or movable; a light transmission member made from a material that transmits light, the light transmission member including a light-incident surface disposed inside the casing and a light-emitting surface disposed along the fringe of the hole; and a shading coating that partially coats a portion of the light-incident surface of the light transmission member which receives a larger amount of light.

In the aforementioned air-conditioning control box, some of the light emitted from the light source directly enters the light-incident surface of the light transmission member. The remaining portion of the light is reflected by the inner surface of the casing and then hits the light-incident surface. The light enters the transmission member through the light-incident surface except the portion covered with the shading coating and is transmitted through the transmission member. As a result, the light-emitting surface radiates light.

DETAILED DESCRIPTION OF THE PREFERRED EMBODIMENTS

Preferred embodiments of the invention are hereinafter described in detail with reference to the accompanying drawings.

Figure 1:
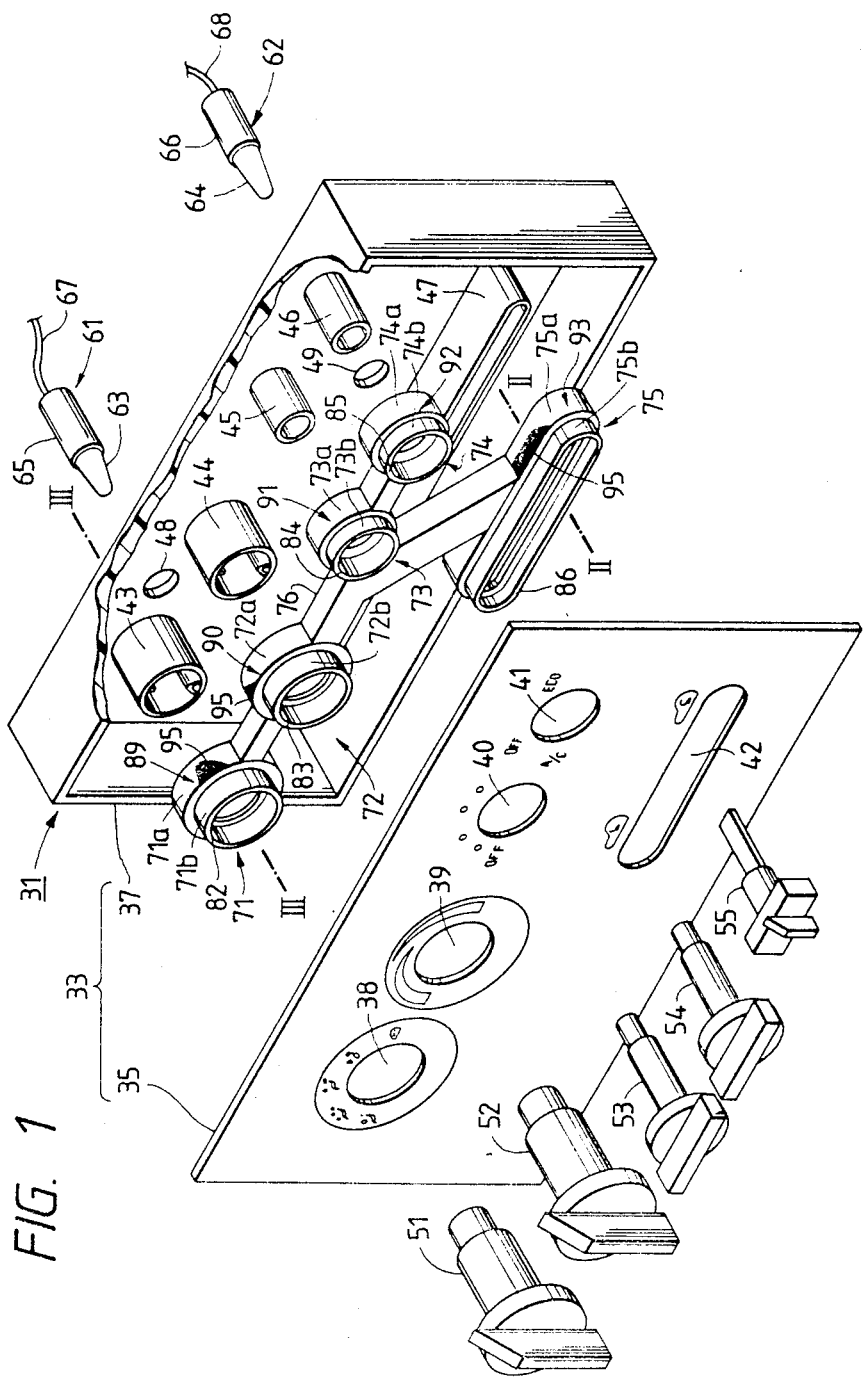
FIG. 1 is a perspective view showing a disassembled state of an air-conditioning control box of the invention.

FIG. 1 is a perspective view showing a disassembled state of an air-conditioning control box 31 according to an embodiment of the invention. The control box 31 comprises a casing 33, light sources 61 and 62, air conditioning control means 51, 52, 53, 54 and 55, and light transmission members 71, 72, 73, 74 and 75.

Figure 4:
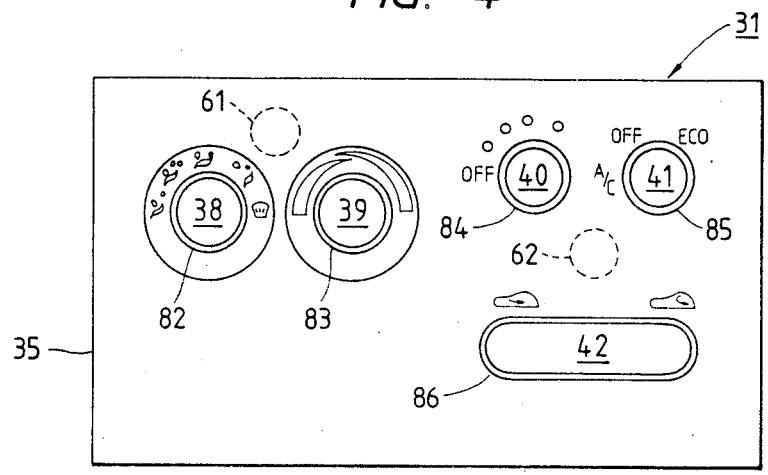
FIG. 4 is a front elevation of the air-conditioning control box shown in FIG. 1, in the case where the air-conditioning control means are not mounted.
Figure 5:
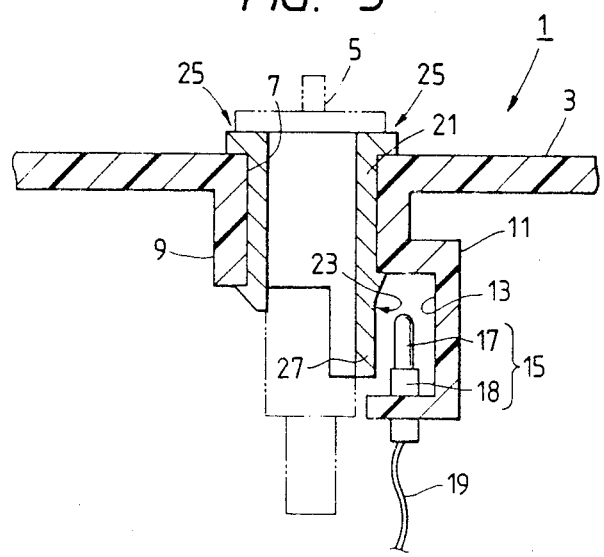
FIG. 5 is a partial cross section of a generally-used air-conditioning control box 1.

The casing 33 consists of a front panel 35 and a rear box 37. The front panel 35 is provided with a pair of large round holes 38 and 39, small round holes 40 and 41 and an elliptic slot 42. Various patterns or designs are provided on the surface of the front panel 35, as shown in FIG. 4. A pair of large retainers 43 and 44, small retainers 45 and 46, and an elliptical retainer 47 protrude from the inner surface of the rear box 37. The air-conditioning control means 51 and 52 are inserted in the large retainers 43 and 44, respectively. The air-conditioning control means 53 and 54 are inserted in the small retainers 45 and 46, respectively. The air-conditioning control means 55 is inserted in the elliptical retainer 47. Light sources 61 and 62 have sockets 65 and 66 which are respectively inserted in holes 48 and 49 formed on the rear box 37. The sockets 65 and 66 are fitted to the fringes of the holes 48 and 49, respectively, with an interference fit or a screw fit.

The inner surface of the rear box 37 and the rear surface of the front panel 35 facing the inner surface of the rear box are made white to reflect light at a high efficiency. For this purpose, the front panel 35 and the rear box 37 are made of a white material such as white synthetic resin, or a white paint is applied to the front panel and the rear box. It is noted, however, that only the inner surface of the rear box 37 may be made white.

The light sources 61 and 62 comprise light bulbs 63 and 64 and the sockets 65, 66, respectively. The light sources 61 and 62 are connected to a battery (not shown) through wires 67 and 68, respectively.

With respect to the light transmission members, the first transmission member 71 and the second transmission member 72 are cylindrical and have a large diameter. These transmission members 71 and 72 are located below the light source 61. The third transmission member 73 and the fourth transmission member 74 are cylindrical and have a small diameter. These members 73 and 74 are located above the light source 62. The fifth transmission member 75 takes the form of a tube of an elliptical cross section. This member 75 is disposed below the light source 62. The transmission members 71 through 75 are connected to one another by a connecting member 76.

The transmission members 71, 72, 73, 74 and 75 comprise large-diameter portions 71a, 72a, 73a, 74a and 75a and small-diameter portions 71b, 72b, 73b, 74b and 75b, respectively. The large-diameter portions 71a through 75a are connected to the connecting member 76. The small-diameter portions 71b through 75b are respectively inserted in the holes 38, 39, 40, 41 and 42 formed in the front panel 35. The front end surfaces of the small-diameter portions 71b, 72b, 73b, 74b and 75b are disposed along the fringes of the holes 38, 39, 40, 41 and 42, respectively. These front end surfaces form light-emitting surfaces 82, 83, 84, 85 and 86, respectively, as shown in FIG. 4. The outer surfaces of the large-diameter portions 71a, 72a, 73a, 74a and 75a of the transmission members form light-incident surfaces 89, 90, 91, 92 and 93, respectively.

Figure 2:
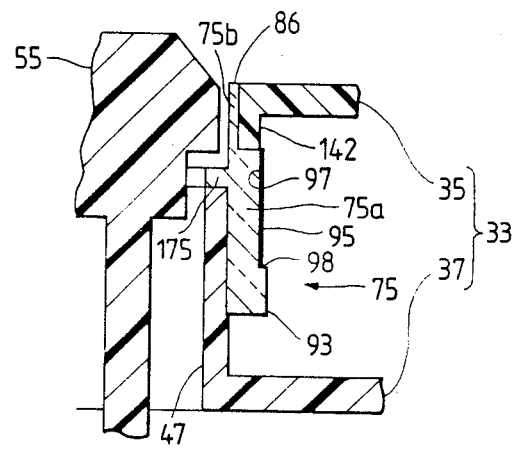
FIG. 2 is an cross-sectional view taken on line II—II of FIG. 1.

The light transmission members 71, 72, 73, 74 and 75 are held between the front panel 35 and the rear box 37, and therefore, they are fixed to the casing 33. We will describe in greater detail hereinafter the state where the light transmission member is mounted in the casing. As an example, FIG. 2 shows the light transmission member 75 mounted in the casing 33. The upper fringe of the large-diameter portion 75a and a protrusion 175 are held by an extension 142 extending from the fringe of the hole 42 in the front panel 35 and the retainer 47, respectively. The protrusion 175 extends from the inner surface of the large-diameter portion 75a radially continuously or discontinuously.

Figure 3:
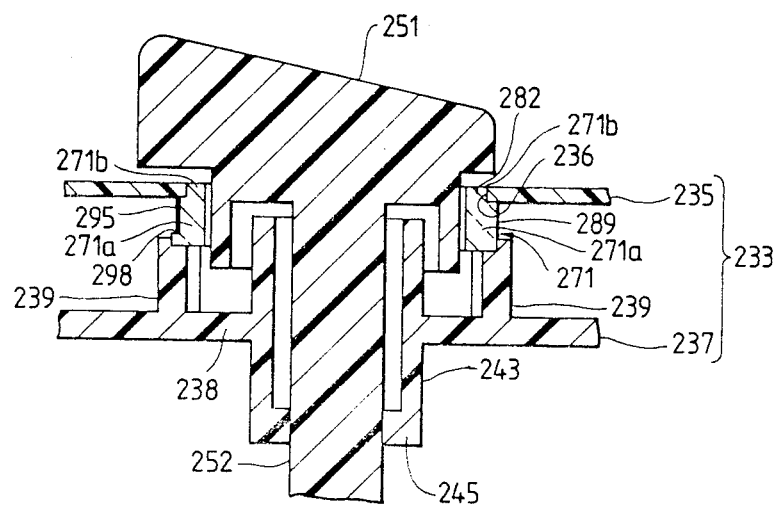
FIG. 3 is a cross-sectional view showing assembled state of another example of a light transmission member and a casing, taken on line III—III of FIG. 1.

FIG. 3 shows the manner in which another example of the light transmission member (271) is mounted in another example of the casing (233). The casing 233 consists of a front panel 235 and a rear box 237. The front panel 235 is made of a paper coated with a resin, and is provided with a hole 236. The rear box 237 is made of a white resin and has a retainer 243 for receiving the shaft 252 of a control means 251. The rear end 245 of the retainer 243 forms a shaft bearing that limits movement of the shaft 252.

In this example, the rear box 237 has a bottom plate 238 connected to about the center of the side surface of the retainer 243. Therefore, the casing 233 can be made smaller than the casing shown in FIGS. 1 and 2.

Four protrusions 239 protruding into the casing are formed on the bottom plate 238 and circumferentially spaced from one another with an interval of 90 degrees. Of course, the number of the protrusions is not restricted to four. As an example, three protrusions can be formed. Furthermore, these protrusions can be made continuous to form a cylinder-shaped protrusion.

The light transmission member 271 comprises a large-diameter portion 271a and a small-diameter portion 271b whose upper surface forms a light-emitting surface 282. The large-diameter portion 271a is placed on the protrusions 239 and held between the front panel 235 and the protrusions 239. The small-diameter portion 271b is located along the fringe of hole 236. The large-diameter portion 271a and the small-diameter portions 271b are located coaxially. The light transmission member 271 is cylindrical as a whole. A shading coating 295 is formed on the outer periphery of the large portion 271a, the remaining surface forming a light-incident surface 289. Indicated by numeral 282 is a light-emitting surface. This light transmission member 271 is connected to other adjacent light transmission members (not shown) by a connecting member in the same manner as the structure shown in FIG. 1.

Referring back to FIGS. 1 and 2, the light transmission members 71, 72, 73, 74 and 75 and the connecting member 76 are formed by injection molding of a transparent resin such as acrylic resin. This material can be semitransparent as long as it can transmit light.

Those portions of the light-incident surfaces 89, 90, 91, 92 and 93 which are close to the light sources 61 and 62 are covered with a shading coating 95. This coating 95 is formed by applying a black color paint. No limitations are imposed on the coating 95 as long as it can obstruct light. In this embodiment, the coating 95 is formed on the portions close to the light sources 61 and 62, because a larger amount of light falls on these portions. If other portions of the light-incident surfaces 89 through 93 receive a larger amount of light because of the shape of the inside of the casing 33, then the coating should be formed on these portions. Also, the coating can be formed in a mottled or striped manner.

After the coating is formed in this way, checks should be made to see whether or not the coating is formed at the correct positions, whether or not the area of the coating is too large, and whether or not the coating is formed correctly and properly. For this purpose, it is preferable to form a step 98 between the coated region 97 of the light-incident surface 93 and the uncoated region, as shown in FIG. 2. In the illustrated example, the coated region 97 is in concave shape. Or, the region 97 may be convex shape.

In the air-conditioning control box 31 constructed as described above, light emitted from the light sources 61 and 62 are reflected at least at the inner surface of the rear box 37 and therefore the light-incident surfaces 89 through 93 of the light transmission members 71 through 75 are all illuminated entirely with the light. Of course, some of the light emitted from the light sources 61 and 62 directly strikes the incident surfaces. The light incident on the transmission members 71 through 75 is transmitted through the transmission members while being reflected diffusedly, and then exits from the light-emitting surfaces 82 through 86, so that the surfaces 82 through 86 become luminous. As described already, the portions of the light-incident surfaces 89 through 93 which receive a larger amount of light are partially shielded by the shading coating 95. As a result, the light entering the transmission members through such the portions receiving a larger amount of light can be made substantially equal, in amount per unit area, to the light entering the transmission members through portions receiving a less amount of light. (Such portions receiving a less amount of light are generally remote from the light sources.) Therefore, luminance brightness of the light-emitting surfaces 82 through 86 can be made substantially equal to one another. The light-emitting surfaces 82 through 86 can effectively illuminate the air-conditioning control means 51 through 55.

In the embodiment described above, each light transmission member is tubular in shape. Of course, the transmission members are not limited to this shape. As an example, they may be in the form of plate. In this case, the end surface and the side surface of each transmission member form a light-emitting surface and a light-incident surface, respectively. The transmission members are mounted in the holes in the front panel with an interference fit and fixed to the casing.

Furthermore, the amount of light hitting each light-incident surface can be increased by coating the inner surface of the casing with a silver paint.

As described above, an air-conditioning control box according to the invention comprises: a casing consisting of a front panel and a rear box and having an inner surface which reflects light at a high efficiency; light sources mounted in the casing; air-conditioning control means which are inserted in holes formed in the front panel and which are held to the casing so as to be rotatable or movable; light transmission members made of a material that transmits light, each of the light transmission members including a light-incident surface and a light-emitting surface, each of the light transmission members being disposed so that the light-incident surface is disposed inside the casing and the light-emitting surface is disposed along a fringe of corresponding one of the holes; and a shading coating that partially coats those portions of the light-incident surfaces of the light transmission members which receive a larger amount of light.

In the air-conditioning control box of this structure, all the portions of the light-incident surfaces can be certainly illuminated with light which is reflected from the inner surface of the casing after emanating from the light Sources. That is, the light sources are only required to illuminate the inner surface of the casing. Hence, the number of the light sources can be reduced. This permits a reduction in the number of the components of the air-conditioning control box.

Since the portions of the light-incident surfaces of the transmission members which receive a larger amount of light are partially covered with the shading coating, the light entering the illuminating member through all the portions of the light-incident surfaces are substantially equal to one another in amount per unit. Therefore, the brightness of the light-emitting surface can be made uniform even if the transmission member is made short. Consequently, the control box itself can be reduced in size.

What is claimed is:

1. A casing assembly, comprising:
   a casing comprising a front panel and a rear box, said front panel formed with a hole therein;
   a light source mounted in said casing;
   control means disposed in the hole formed in the front panel and coupled to the casing;
   a light transmission member made of a material that transmits light, said light transmission member including a light-incident surface disposed inside the casing and a light-emitting surface disposed at the hole; and
   a shading coating that partially coats a portion of the light-incident surface of said light transmission member which portion is located to receive a larger amount of light, to make uniform the brightness of the light emitting surface.

2. A casing assembly as in claim 1, wherein an inner surface of said rear box reflects light at a high efficiency.

3. A casing assembly as in claim 2, wherein a rear surface of said front panel facing the inner surface of said rear box reflects light at a high efficiency.

4. A casing assembly as in claim 2, wherein said rear box is made of a white synthetic resin.

5. A casing assembly as in claim 1, wherein said light transmission member is shaped in the form of a tube having a light-emitting surface at its upper surface and a light-incident surface at its outer circumferential side surface.

6. The air-conditioning control box of claim 5, wherein a plurality of said light transmission members are connected to one another by a connecting member.

7. A casing assembly as in claim 6, wherein said outer circumferential side surface of each said light transmission member has a step to partition the light-incident surface from the shading coating.

8. A casing assembly as in claim 6, wherein said light transmission members are sandwiched between the front panel and the rear box.

9. A casing assembly as in claim 6, wherein said outer circumferential side surface of each said light transmission member has a step to partition the light-incident surface from the shading coating, and wherein said light transmission members are sandwiched between the front panel and the rear box.

10. A casing assembly as in claim 9, wherein the light transmission members are located on the portions protruding from the rear box into the casing.

11. A casing assembly as in claim 1 wherein said light transmission member extends into an interior portion of said rear box, and said light incident surface is defined by an edge of said light transmission member within said rear box.

* * * * *